United States Patent
Bitout et al.

(10) Patent No.: US 12,453,995 B2
(45) Date of Patent: Oct. 28, 2025

(54) METHOD FOR MANUFACTURING AN ALUMINIUM TUBE, A METHOD FOR MANUFACTURING AN ALUMINIUM SLUG, AN ALUMINIUM TUBE AND AN ALUMINIUM SLUG

(71) Applicant: TUBEX Tubenfabrik Wolfsberg GmbH, St. Stefan (AT)

(72) Inventors: Thierry Bitout, Hradec Kralove (CZ); Oliver Glitzner, Wilhelmsburg (AT); Alexander Wimmer, Weinburg (AT)

(73) Assignee: TUBEX TUBENFABRIK WOLFSBERG GMBH, St. Stefan (AT)

( * ) Notice: Subject to any disclaimer, the term of this patent is extended or adjusted under 35 U.S.C. 154(b) by 0 days.

(21) Appl. No.: 17/769,128

(22) PCT Filed: Oct. 16, 2020

(86) PCT No.: PCT/EP2020/079221
§ 371 (c)(1),
(2) Date: Apr. 14, 2022

(87) PCT Pub. No.: WO2021/074384
PCT Pub. Date: Apr. 22, 2021

(65) Prior Publication Data
US 2023/0101127 A1     Mar. 30, 2023

(30) Foreign Application Priority Data
Oct. 16, 2019    (EP) .................................. 19203569

(51) Int. Cl.
*B21C 23/00*     (2006.01)
*B21C 23/08*     (2006.01)
(Continued)

(52) U.S. Cl.
CPC .......... *B21C 23/002* (2013.01); *B21C 23/085* (2013.01); *C22C 1/026* (2013.01); *C22C 21/00* (2013.01); *C22F 1/04* (2013.01)

(58) Field of Classification Search
CPC ..... B21C 23/002; B21C 23/085; C22C 21/00; C22C 21/02
See application file for complete search history.

(56) References Cited

U.S. PATENT DOCUMENTS

| | | | |
|---|---|---|---|
| 9,517,498 B2 | 12/2016 | Siles et al. | |
| 2013/0068352 A1 | 3/2013 | Siles et al. | |

FOREIGN PATENT DOCUMENTS

| | | |
|---|---|---|
| AU | 4959179 A1 | 8/1980 |
| CN | 103863674 A | 6/2014 |

(Continued)

OTHER PUBLICATIONS

European Search Report issued in corresponding European Application No. 19 20 3569.9 dated Apr. 17, 2020 (6 pages).
(Continued)

*Primary Examiner* — Adam Krupicka
(74) *Attorney, Agent, or Firm* — FLYNN THIEL, P.C.

(57) ABSTRACT

A method for manufacturing an aluminium tube, including providing a slug of an aluminium alloy consisting of—>98.4% by weight of Al, —0.10% by weight to 0.30% by weight of Si, —0.25% by weight to 0.45% by weight of Fe, —0.01% by weight to 0.08% by weight of Cu, —0.15% by weight to 0.40% by weight of Mn, —at most 0.15% by weight of Mg, —at most 0.05% by weight of Zn, —at most 0.05% by weight of Cr, —at most 0.05% by weight of Ni, —at most 0.05% by weight of Ti and—at most 0.05% by weight of other impurities, wherein the aforementioned ingredients of the aluminium alloy add to 100% by weight, (Continued)

Figure 2A:
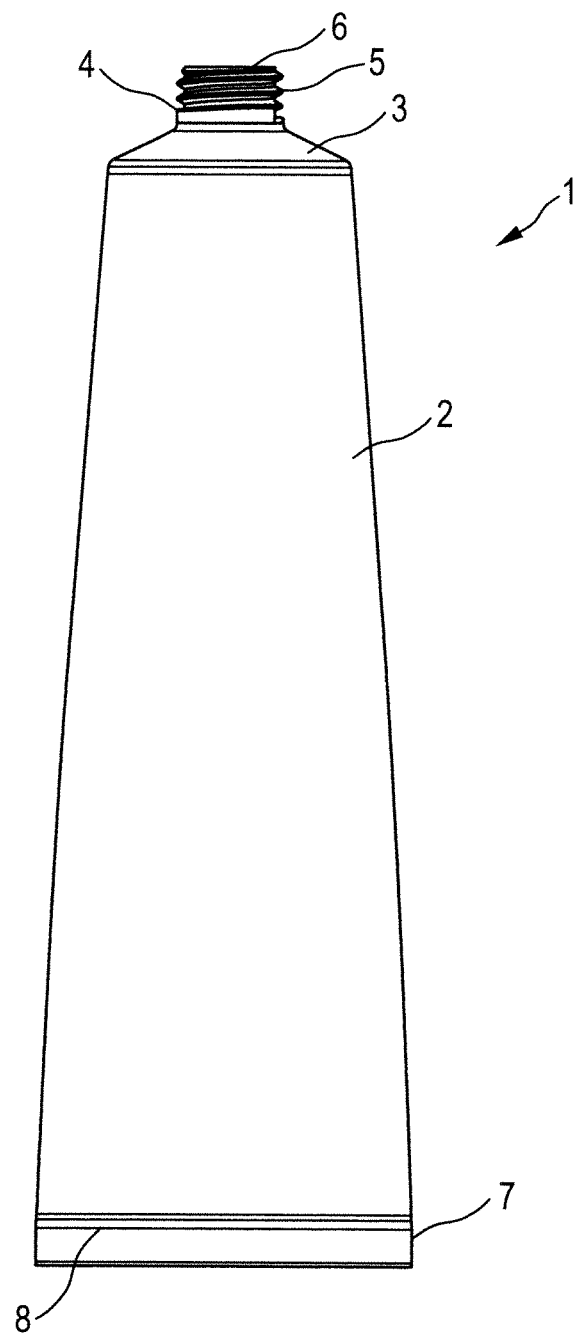

and impact extrusion of the slug to form an aluminium tube having a shoulder and a neck.

10 Claims, 2 Drawing Sheets

(51) Int. Cl.
    *C22C 1/02*     (2006.01)
    *C22C 21/00*     (2006.01)
    *C22F 1/04*     (2006.01)

(56) References Cited

FOREIGN PATENT DOCUMENTS

| | | |
|---|---|---|
| EP | 0138290 A2 | 4/1985 |
| GB | 1354373 | 5/1974 |
| JP | 200967401 A | 4/2009 |
| RU | 2642231 C2 | 5/2017 |
| WO | 2013040339 A1 | 3/2013 |
| WO | 2018125199 A1 | 7/2018 |

OTHER PUBLICATIONS

International Search Report issued in corresponding International Application No. PCT/EP2020/079221 date of mailing Jan. 20, 2021 (4 pages).

Written Opinion of International Searching Authority issued in corresponding International Application No. PCT/EP2020/079221 dated Jan. 20, 2021 (5 pages).

Aluminium in the Packaging Industry; Production—Use—Recycling; GDA Gesamtverband Der Aluminiumindustrie e.V.; Publicly available prior to the effective filing date of the claimed invention (13 pages).

Nancy Bazilchuk, Recycling aluminium, one can at a time; published Apr. 29, 2015 (2 pages).

Mark E. Schlesinger, Exerpt from Aluminium Recycling; Publicly available prior to the effective filing date of the claimed invention (1 page).

Stefano Capuzzi et al., Preparation and Melting of Scrap in Aluminium Recycling: A Review, metals, Department of Management and Engineering, University of Padova; Published Apr. 8, 2018 (24 pages).

Andres Tominaga Terukina, Barriers and solutions for closed loop aluminium beverage can recycling; NTNU—Trondheim Norwegian Univeristy of Science and Technology; Department of Hydraulic and Environmental Engineering, Published 2013 (59 pages).

Widyantoro, Donanta Dhaneswaral et al., Removal of Oxide Inclusions in Aluminium Scrap Casting Process with Sodium based Fluxes; Department of Metallurgical and Materials Engineering, Faculty of Engineering, Universitas Indonesia; MATEC Web of Conferences 269, 07002 (2019) (5 pages).

Russian Office Action with English Translation issued in corresponding Russian Patent Application No. 2022110223/05, dated Mar. 6, 2024 (21 pages).

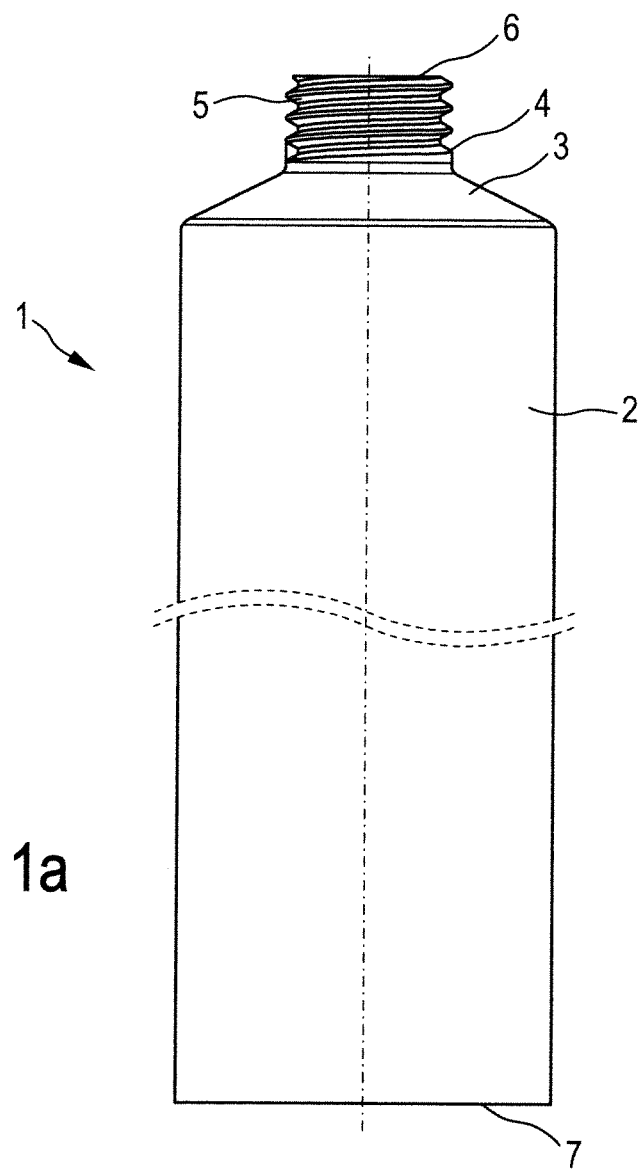
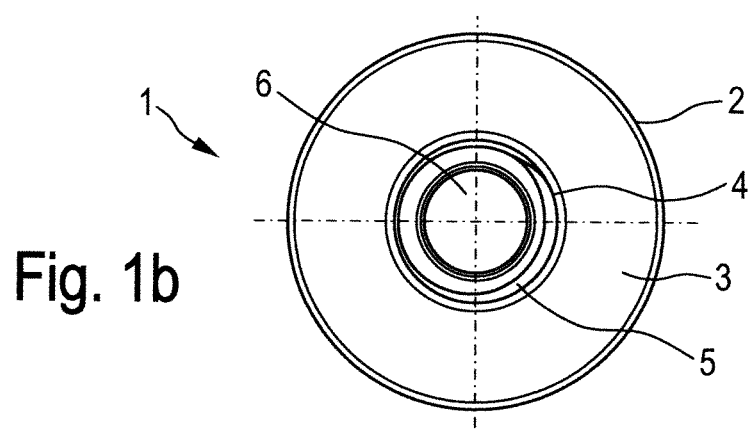

METHOD FOR MANUFACTURING AN ALUMINIUM TUBE, A METHOD FOR MANUFACTURING AN ALUMINIUM SLUG, AN ALUMINIUM TUBE AND AN ALUMINIUM SLUG

FIELD OF THE INVENTION

The present invention relates to a method for manufacturing an aluminium tube and an aluminium slug and refers further to an aluminium tube and an aluminium slug.

BACKGROUND OF THE INVENTION

Tubes are collapsible containers or packages which can be in particular used for pasty or semi-liquid products like food stuff, cosmetics, care products, pharmaceutical products such as ointments or technical products such as adhesives, paints, and the like. Tubes offer many advantages. For example, they exhibit excellent barrier properties to protect the tube content against negative external influences such as light, moisture or microorganisms. In addition, tubes facilitate efficient and complete discharge of the tube content and a wide variety in terms of dimension and decoration possibilities.

In principle, tubes can be made either from polymers or aluminium. Indeed, during the last decades, polymers have been applied more widely in tube production. However, the application of polymers has raised serious ecological issues with respect to disposal of plastic waste and an omnipresent pollution of the environment with plastic waste.

Aluminium tubes are typically produced from primary, i.e. virgin, aluminium alloy, in particular from an aluminium alloy having the composition EN-AW 1070A according to DIN EN 573-3. Though, primary aluminium alloy does not raise any omnipresent pollution issues, it suffers from the drawback that its production is based on an energy-intensive process.

A process for manufacturing aerosol cans using aluminium scrap is known from WO 2013/040339 A1 and WO 2018/125199 A1. However, aerosol cans are subject to requirements (e.g. high pressure resistance) being completely different from requirements for collapsible or squeezable tubes (e.g. easy foldability/squeezability). While aerosol cans are being classified as "rigid aluminium packaging", collapsible or squeezable tubes are being characterized as "semi rigid aluminium packaging" (according to Fact Sheet "Aluminium in the packaging industry", GDA Gesamtverband der Aluminiumindustrie). For the discharge of products, aerosol cans typically contain propellants and thus are under overpressure. Therefore, aerosol cans must exhibit sufficient pressure resistance. In accordance with that, compressibility or squeezability of aerosol cans would be detrimental to the required pressure resistance. In sharp contrast, collapsible or squeezable tubes are under no overpressure or only a very small overpressure and discharge of products is typically accomplished with manual pressure on the tubes.

Further, the availability of aluminium scrap is principally limited, at least as far as post-industrial waste as a source for aluminium scrap is concerned, since manufacturing companies seek to reduce their reject or scrap rate as far as possible.

Post-consumer waste as a source for aluminium scrap suffers from the drawback that its composition is often not clearly defined and/or is subject to fluctuations. This strongly complicates the recycling process. In addition, impurities may deteriorate the quality of post-consumer recycled aluminium scrap. Therefore, aluminium scrap is typically diluted with primary aluminium alloy so as to achieve a defined composition as much as possible and thus reliable product properties (see Recycling aluminium, one can at a time, Nancy Bazilchuk, 29.04.15; Aluminium Recycling, Mark E. Schlesinger; Preparation and Melting of Scrap in Aluminium Recycling: A Review, Stefano Capuzzi et al., Metals, 2018, 8, 249, 1-24; Barriers and solutions for closed-loop aluminium beverage can recycling, Andres Tominaga Terukina, Master in Industrial Ecology, Norwegian University of Science and Technology; Removal of Oxide Inclusions in Aluminium Scrap Casting Process with Sodium based Fluxes, Widyantoro et al. MATEC Web of Conferences 269, 07002 (2019)). In accordance with this, WO 2013/040339 A1 teaches a maximum proportion of aluminium scrap being limited to 60% by weight, based on the total weight of the aerosol cans, so as to avoid any impairment of the containers' quality.

A further problem is that the composition of post-consumer recycled aluminium scrap often results in an increased hardness of products. However, an increased hardness is detrimental with respect to the manufacture of collapsible tubes, making it more difficult to squeeze and fold the tubes when emptying the tubes. In addition, the flow properties of the metal during impact extrusion can also be negatively influenced leading to problems with the integration of the membrane in the tube neck and ultimately to leaks.

For sustainability and handling reasons, it is further desired to provide collapsible tubes with reduced shoulder thickness. In tubes with regular shoulder thickness values (e.g. according to DIN EN 13046), there is the risk of incomplete emptying of the tube due to impeded squeezability of the shoulder. While the reduction in shoulder thickness allows for a more complete emptying due to an easier deformability and squeezability of the tube shoulder part by manual pressure, it also comes along with material savings and therefore less weight of the tube.

OBJECT AND SOLUTION

In view of the foregoing, the object underlying the present invention is therefore to make available a method for manufacturing an aluminium tube, a method for manufacturing an aluminium slug and to make available an aluminium tube and an aluminium slug, which at least partly circumvent disadvantages as described above in the context of tubes, in particular collapsible tubes, and their manufacture.

This object is accomplished by a method for manufacturing an aluminium tube or an aluminium slug according to claim 9. Preferred embodiments are defined in the dependent claims and the present description. The subject-matter and wording, respectively, of all claims is hereby incorporated into the description by explicit reference.

According to a first aspect, the invention relates to a method for manufacturing or producing an aluminium tube, in particular a flexible, preferably collapsible or squeezable, aluminium tube.

The method comprises the following steps:
a) providing a slug comprising or consisting of an aluminium alloy consisting of
>98.4% by weight of Al,
0.10% by weight to 0.30% by weight of Si,
0.25% by weight to 0.45% by weight of Fe,
0.01% by weight to 0.08% by weight of Cu, 0.15% by weight to 0.40% by weight of Mn,
at most 0.15% by weight of Mg,
at most 0.05% by weight of Zn,
at most 0.05% by weight of Cr,
at most 0.05% by weight of Ni,
at most 0.05% by weight of Ti and
at most 0.05% by weight of other alloying elements and/or other impurities,
with the proviso that the aforementioned ingredients of the aluminium alloy add to 100% by weight, and
b) impact extrusion of the slug to form an aluminium tube, in particular to form an aluminium tube having a shoulder and a neck.

The term "tube" as used according to the present invention preferably refers to a collapsible or squeezable package, wherein the package is at least in sections, in particular only in sections or continuously, in its longitudinal direction in the form of a circular or oval cylinder. In other words, the term "tube" as used according to the present invention preferably refers to a collapsible or squeezable package, wherein the package has at least in sections, in particular only in sections or continuously, in its longitudinal direction a circular or oval cross-section. More preferably, the term "tube" as used according to the present invention refers to a collapsible or squeezable package or tube being adapted or designed to be dispensed with hand pressure, in particular with hand pressure applied on a tube body and/or a tube shoulder of the package and tube, respectively.

Preferably, the aluminium tube has a shoulder and a neck. The shoulder is typically a conical shaped portion of the aluminium tube which is arranged, in particular immediately arranged, between a tube body of the aluminium tube and a neck portion of the aluminium tube. Expediently, the shoulder immediately merges into the neck portion. The neck portion is adapted to allow discharge of the tube content via an opening. Expediently, the neck portion comprises a thread, in particular an external or male thread, preferably a circular external or male thread. The thread is preferably adapted to interact or engage with a complementary internal or female thread of a cap being adapted to close the aluminium tube.

Further, the aluminium tube may have a tube volume or storage volume which ranges from 1.5 ml to 350 ml, in particular 20 ml to 220 ml.

Further, the aluminium tube may have a wall which at least partly, in particular only partly or completely, surrounds or encases the above-mentioned tube volume or storage volume. In particular, the aluminium tube may have an open or unclosed rear end, i.e. an open or unclosed end opposite to an end of the aluminium tube having the shoulder and the neck. Advantageously, the open or unclosed rear end allows filling of the aluminium tube with a desired content such as cosmetics (e.g. tooth paste), pharmaceutical products (e.g. ointments), artist paints, adhesives, caulks, and the like. In particular after filling, the aluminium tube is preferably folded and/or crimped and/or sealed at its rear end. Accordingly, it may be preferred according to the present invention that the aluminium tube has a folded and/or crimped and/or sealed rear end. More specifically, the rear end of the aluminium tube may have a double fold, triple fold or saddle fold.

Further, for example unlike aerosol cans as known from WO 2018/125199 A1, the aluminium tube according to the present invention is preferably free of any spray valve.

Further, for example unlike aerosol cans as known from WO 2018/125199 A1, the aluminium tube according to the present invention is preferably not provided to be filled under overpressure and/or with a propellant.

Further, the aluminium tube according to the present invention preferably has a deformation according to DIN EN 16285 ("guillotine test") from 1 mm to 43 mm, in particular 11 mm to 31 mm.

The term "post-consumer recycled aluminium scrap" as used according to the present invention refers to aluminium waste material generated by consumers or end-users (e.g. households or commercial or institutional facilities) of products or goods comprising or consisting of aluminium, e.g. packaging material like aluminium cans or tubes.

The term "post-industrial recycled aluminium scrap" as used according to the present invention refers to aluminium waste material generated in a production facility during a manufacturing process, typically in the form of product scrap, punching or cutting waste or raw or semi-finished products.

The term "primary aluminium alloy" as used according to the present invention refers to a virgin, i.e. not recycled, aluminium alloy, typically produced by means of an aluminium smelter, comprising at least 99.5% by weight, in particular 99.7% by weight, of pure, i.e. elemental, aluminium, based on the total weight of the aluminium alloy. For example, the term "primary aluminium alloy" and "virgin aluminium alloy", respectively, as used according to the present invention may refer to the aluminium alloy EN-AW 1050A (according to DIN EN 573-3) and/or EN-AW 1070A (according to DIN EN 573-3).

The term "EN-AW 1050A" as used according to the present invention refers—according to DIN EN 573-3—to an aluminium alloy comprising or consisting of 99.5% by weight of Al, at most 0.25% by weight of Si, at most 0.4% by weight of Fe, at most 0.05% by weight of Cu, at most 0.05% by weight of Mn, at most 0.05% by weight of Mg, at most 0.07% by weight of Zn and at most 0.05% by weight of Ti.

The term "EN-AW 1070A" as used according to the present invention refers to an aluminium alloy which has—in accordance with DIN EN 573-3—a composition comprising or consisting of 99.7% by weight of Al, at most 0.03% by weight of Cu, at most 0.25% by weight of Fe, at most 0.03% by weight of Mg, at most 0.03% by weight of Mn, at most 0.20% by weight of Si, at most 0.03% by weight of Ti and at most 0.07% by weight of Zn.

The term "slug" as used according to the present invention refers to a circular or non-circular, in particular oval or polygonal, disk, i.e. cylinder, in particular flat cylinder. Preferably, the slug according to the present invention is in the form of a circular disk, in particular circular cylinder. In particular, the slug may have a diameter of 10.5 mm to 50 mm, in particular 21 mm to 40 mm, and/or a height of 3 mm to 8 mm, in particular 3.2 mm to 6 mm.

The term "other impurities" as used according to the present invention refers to other impurities, in particular other unavoidable impurities, than Mg and/or Zn and/or Cr and/or Ni and/or Ti.

The term "impact extrusion" as used according to the present invention refers to a process utilized to convert a slug into an aluminium tube. The aluminium tube is formed inside a confining die from a slug. The slug is contacted by a punch. The force from the punch softens and deforms the slug and the slug flows upwards and downwards along the die. Thus, a tube body is backward extruded in one direction and in particular a tube shoulder and a tube neck are forward extruded in the other direction.

The present invention rests in particular on the surprising finding that the problem of a high hardness level, in particular when manufacturing collapsible or squeezable aluminium tubes (as mentioned in the introduction) may be properly addressed by using an aluminium alloy as defined above. Thus, manufacture or production of aluminium slugs and aluminium tubes, in particular of aluminium tubes exhibiting good squeezability and emptiability, in producible and high quality is achievable.

In an embodiment of the invention, the aluminium alloy consists of
>98.7% by weight of Al,
0.15% by weight to 0.25% by weight of Si,
0.30% by weight to 0.40% by weight of Fe,
0.02% by weight to 0.06% by weight of Cu,
0.20% by weight to 0.30% by weight of Mn,
at most 0.05% by weight, in particular <0.04% by weight, preferably <0.03% by weight, more preferably <0.02% by weight, especially preferably <0.01% by weight, of Mg,
at most 0.05% by weight of Zn,
at most 0.05% by weight of Cr,
at most 0.05% by weight of Ni,
at most 0.05% by weight of Ti and
at most 0.05% by weight of other alloying elements and/or other impurities,
with the proviso that the aforementioned ingredients of the aluminium alloy add to 100% by weight. The aluminum alloy according to this embodiment of the invention is especially useful for attenuating or avoiding any hardness issue in respect of manufacturing aluminium tubes.

In a further embodiment of the invention, the slug is manufactured or produced by using post-consumer recycled aluminium scrap. In particular, the slug is manufactured or produced by merely, i.e. exclusively, using post-consumer recycled aluminium scrap. Post-consumer recycled aluminium scrap has principally the advantage that the underlying source, i.e. post-consumer aluminium waste, is readily available, in particular in comparison to post-industrial aluminium waste. For example, post-consumer aluminium waste is readily available from municipal waste collection systems and/or from specific collection initiatives, for example from cosmetic manufactures and/or sellers of aluminium cans, in particular aerosol aluminium cans. In addition, using post-consumer recycled aluminium scrap advantageously contributes to significantly save energy costs, thereby emphasizing the recyclability and sustainability of aluminium.

In a further embodiment of the invention, the slug is made or produced of >60% by weight, in particular >75% by weight, preferably >90% by weight, of post-consumer recycled aluminium scrap, based on the total weight of the slug. In other words, in a further embodiment of the invention, the slug has a proportion of post-consumer recycled aluminium scrap of >60% by weight, in particular >75% by weight, preferably >90% by weight, based on the total weight of the slug. In that regard, the present invention rests on the further surprising finding that post-consumer recycled aluminium scrap may be employed in a considerably higher content or proportion for manufacturing or producing aluminum tubes, preferably collapsible or squeezable aluminium tubes, than known from the prior art and concurrently without impairing the quality of the aluminium tubes, in particular without increasing the hardness of the aluminium tubes.

In particular, the slug may be made or produced from post-consumer recycled aluminium scrap in a proportion from 65% by weight to 100% by weight, in particular 80% by weight to 100% by weight, preferably 95% by weight to 100% by weight, more preferably 97% by weight to 100% by weight, especially preferably 99% by weight to 100% by weight, based on the total weight of the slug. In other words, the slug may in particular have a proportion of post-consumer recycled aluminium scrap from 65% by weight to 100% by weight, in particular 80% by weight to 100% by weight, preferably 95% by weight to 100% by weight, more preferably 97% by weight to 100% by weight, especially preferably 99% by weight to 100% by weight, based on the total weight of the slug.

More preferably, the slug is made or produced exclusively from post-consumer recycled aluminium scrap.

In a further embodiment of the invention, the slug is produced by blending at least one fraction of post-consumer recycled aluminium scrap with at least one fraction of primary aluminum alloy and/or with at least one fraction of post-industrial recycled aluminium scrap. Preferably, the primary aluminium alloy may have the composition of the aluminium alloys/aluminium alloy EN-AW 1050A and/or EN-AW 1070A. Using post-industrial recycled aluminium scrap is principally advantageous in terms of its good predictable composition, due a (good) traceable origin of post-industrial aluminium waste.

The post-industrial recycled aluminium scrap may be in particular produced or recycled or recovered from aluminium workpieces, in particular aluminium slugs, and/or from semi-finished aluminium products, in particular raw aluminium cans, in particular raw aluminium aerosol cans, and/or raw aluminium tubes, and/or from finished aluminium products, in particular (finished) aluminium cans, in particular (finished) aluminium aerosol cans, and/or (finished) aluminium tubes.

Further, the post-industrial recycled aluminium scrap may be in particular produced or recycled or recovered from waste from the production of aluminium workpieces, in particular aluminium slugs, and/or from the production of semi-finished aluminium products such as raw aluminium cans, in particular raw aluminium aerosol cans, and/or raw aluminium tubes, and/or from the production of finished aluminium products such as (finished) aluminium cans, in particular (finished) aluminium aerosol cans, and/or (finished) aluminium tubes.

Further, the post-industrial recycled aluminium scrap may be in particular produced or recycled or recovered from punching waste, in particular from aluminium slug production and/or a cutting waste, in particular from aluminium can production, in particular aluminium aerosol can production, and/or aluminium tube production.

Further, the post-industrial recycled aluminium scrap may be in particular produced or recycled or recovered from aluminium can waste, in particular aluminium aerosol can waste, i.e. from waste, which accrues during production of aluminium cans, in particular aluminium aerosol cans, and/or from aluminium tube waste, i.e. from waste, which accrues during production of aluminium tubes. The aluminium can waste may be in the form of aluminium cans, in particular deficient or damaged aluminium cans, in particular in the form of aluminium aerosol cans, in particular deficient or damaged aluminium aerosol cans, and/or in the form of aluminium tubes, in particular deficient or damaged aluminium tubes. Further, the aluminium cans may be in particular in the form of raw or semi-finished aluminium cans, in particular without having an imprint, or in the form of finished aluminium cans, in particular having an imprint. Further, the aluminium tubes may be in particular in the form of raw or semi-finished aluminium tubes, in particular without having an imprint, or in the form of finished aluminium tubes, in particular having an imprint.

Further, the slug may be free of post-industrial recycled aluminium scrap.

Further, the slug may be free of primary aluminium alloy EN-AW 1050A and/or EN-AW 1070A. In particular, the slug may be free of primary aluminium alloy (in general).

In a further embodiment of the invention, the post-consumer recycled aluminium scrap is produced or recycled or recovered from aluminium cans, in particular aluminium aerosol cans, and/or aluminium tubes.

In a further embodiment of the invention, the slug has a diameter from 10.5 mm to 50 mm, in particular 21 mm to 40 mm.

In a further embodiment of the invention, the slug is produced or manufactured by a method comprising the following steps, expediently in a chronological order:
$a_1$) providing at least one fraction of post-consumer recycled aluminium scrap
or
providing at least one fraction of post-consumer recycled aluminium scrap and at least one fraction of post-industrial recycled aluminium scrap and/or at least one fraction of primary aluminium alloy,
$a_2$) melting the at least one fraction of post-consumer recycled aluminium scrap to a molten mass
or
melting the at least one fraction of post-consumer recycled aluminium scrap and the at least one fraction of post-industrial recycled aluminium scrap and/or the at least one fraction of primary aluminium alloy to a molten mass,
$a_3$) controlling the composition of the molten mass and optionally adding alloying elements to the molten mass,
$a_4$) casting, in particular continuous casting, of the molten mass to a strip or casting, in particular continuous casting, of a remolten mass to form a strip,
$a_5$) hot rolling of the strip,
$a_6$) cold rolling of the hot rolled strip and
$a_7$) forming a slug from the cold rolled strip,
wherein the steps/step a) and/or b) and/or c) are/is carried out such that the molten mass comprises or consists of an aluminium alloy consisting of
>98.4% by weight of Al,
0.10% by weight to 0.30% by weight of Si,
0.25% by weight to 0.45% by weight of Fe,
0.01% by weight to 0.08% by weight of Cu,
0.15% by weight to 0.40% by weight of Mn,
at most 0.15% by weight of Mg,
at most 0.05% by weight of Zn,
at most 0.05% by weight of Cr,
at most 0.05% by weight of Ni,
at most 0.05% by weight of Ti and
at most 0.05% by weight of other alloying elements and/or other impurities,
with the proviso that the aforementioned ingredients of the aluminium alloy add to 100% by weight,
and wherein the steps/step a) and/or b) and/or c) are/is carried out such that the molten mass has proportion of the post-consumer recycled aluminium scrap >60% by weight, in particular >75% by weight, preferably >90% by weight, based on the total weight of the molten mass.

The term "hot rolling" as used according to the present invention refers to rolling of a strip made or produced of recycled aluminium scrap, in particular post-consumer recycled aluminium scrap and/or post-industrial recycled aluminium scrap, and/or primary aluminium alloy above the re-crystallization temperature of pure, i.e. elemental, aluminium, i.e. in a temperature range of 250° C. to 500° C.

The term "cold rolling" as used according to the present invention refers to rolling of a hot rolled strip made or produced of recycled aluminium scrap, in particular post-consumer recycled aluminium scrap and/or post-industrial recycled aluminium scrap, and/or primary aluminium alloy below the re-crystallization temperature of pure, i.e. elemental, aluminium, i.e. below a temperature of 250° C.

Preferably, the steps/step $a_1$) and/or $a_2$) are/is carried out such that the molten mass comprises or consists of an aluminium alloy consisting of
>98.7% by weight of Al,
0.15% by weight to 0.25% by weight of Si,
0.30% by weight to 0.40% by weight of Fe,
0.02% by weight to 0.06% by weight of Cu,
0.20% by weight to 0.30% by weight of Mn,
at most 0.05% by weight, in particular <0.04% by weight, preferably <0.03% by weight, more preferably <0.02% by weight, especially preferably <0.01% by weight, of Mg,
at most 0.05% by weight of Zn,
at most 0.05% by weight of Cr,
at most 0.05% by weight of Ni,
at most 0.05% by weight of Ti and
at most 0.05% by weight of other alloying elements and/or other impurities,
with the proviso that the aforementioned ingredients of the aluminium alloy add to 100% by weight.

In particular the steps/step $a_1$) and/or $a_2$) are/is carried out such that the molten mass has proportion of the post-consumer recycled aluminium scrap from 65% by weight to 100% by weight, in particular 80% by weight to 100% by weight, preferably 95% by weight to 100% by weight, more preferably 97% by weight to 100% by weight, especially preferably 99% by weight to 100% by weight, based on the total weight of the molten mass.

More preferably, the steps/step $a_1$) and/or $a_2$) are/is carried out such that the molten mass is made or produced exclusively from post-consumer recycled aluminium scrap.

Preferably, the remolten mass of step $a_4$) is obtained by casting, in particular continuous casting, of the molten mass formed by means of step $a_2$) to form ingots and subsequently by remelting the ingots to form the remolten mass.

Further, the method may comprise between step $a_2$) and step $a_4$) a further step $a_{2-4}$) cleaning of the molten mass, in particular by means of injection of argon or by means of alternative techniques.

By means of the step $a_3$), it is possible to selectively add alloying elements so as to obtain a molten mass having the desired composition, if need be. Further, the molten mass may be purged, in particular by means of argon. Thus, additional cleaning may be advantageously accomplished.

Further, the method may comprise between step $a_3$) and step $a_4$) a further step $a_{3-4}$) casting of the molten mass to ingots and melting the ingots to form a remolten mass.

Further, the step $a_4$) may be carried out using a casting speed, in particular continuous casting speed, of 4 m/min to 10 m/min.

Preferably, the step $a_4$) is carried out by means of a rotary casting device. The rotary casting device preferably comprises a casting wheel and a steel band. The molten mass or remolten mass may be transferred at a temperature from 680° C. to 750° C. to the casting wheel. Preferably, the molten mass or remolten mass is casted, in particular continuously casted, on the casting wheel and solidified between the casting wheel and the steel band. A cooling necessary for solidification of the molten mass or remolten mass is preferably achieved by spraying water via nozzles on the casting wheel and the steel band.

Further, step a) is preferably carried out at a temperature from 460° C. to 500° C.

Further, the method may comprise between step a) and step a) a further step $a_{5-6}$) cooling the strip to a temperature of 10° C. to 90° C., preferably 30° C. to 70° C.

Further, the step a) is preferably carried out at a temperature from 10° C. to 90° C., preferably 30° C. to 70° C.

Further, the step $a_7$) is preferably carried out by punching out a slug of the cold rolled strip.

Further, the method may comprise a further step $a_8$) annealing of the slug. Preferably, the step $a_8$) is carried out at a temperature from 480° C. to 580° C., preferably 500° C. to 550° C., and/or during a period from 30 minutes to 3 hours. Thus, a homogeneous microstructure and in particular uniform distribution of the optional alloying elements may be accomplished.

Further, the method may comprise a further step $a_9$) cooling the annealed slug, in particular by forced air cooling. Preferably, the step $a_9$) is carried out with a cooling rate of 0.01 K/s to 0.1 K/s.

Further, the method may comprise a further step $a_{10}$) roughening of the cooled slug, in particular by placing the slug in a drum which is rotated or vibrated and thereby deburrs and roughens the slug's surface. Alternatively, the slug may be blasted with an abrasive.

Further, the method for manufacturing or producing an aluminium tube, in particular a flexible, preferably collapsible or squeezable, aluminium tube may comprise between step a) and step b) a further step ab) applying a lubricant such as a metal stearate to the slug. Thus, friction during the impact extruding step (step b) can be advantageously minimized.

Preferably, the method comprises a further step c) cutting the aluminium tube, expediently at a rear end of the aluminium tube, i.e. at an end of the aluminium tube which is arranged opposite to an aluminium tube's end having a shoulder and a neck. Thus, the aluminium tube can be cut to a desired length. The cutting of the aluminium tube can be accomplished by means of a cutting device, in particular comprising a standard cutting knife.

Further, the method preferably comprises a further step d) forming a thread, in particular an external thread, preferably an external circular thread or external oval thread, on or around a neck of the aluminium tube, in particular by using a thread rolling device.

Further, the method preferably comprises a further step e) annealing, i.e. heat treating, the aluminium tube. The aluminium tube may be annealed at a temperature from 380° C. to 490° C. Further, the annealing step may be carried out during a period of 2 minutes to 3.5 minutes. Advantageously, the annealing step facilitates softening of the aluminium tube and makes it collapsible or squeezable.

Further, the method preferably comprises a further step f) applying a coating, in particular lacquer, on an interior surface of the aluminium tube. The coating may comprise or consist of an epoxy-phenol-resin and/or polyamide-imide and/or a polyester based lacquer. The coating may be applied by means of spray nozzles.

Further, the method preferably comprises a further step g) curing of the coating, in particular lacquer, applied on the interior surface of the aluminium tube. The curing step may be carried out, in particular in a furnace, at a temperature from 200° C. to 280° C. and/or during 5 minutes to 8 minutes.

Further, the method preferably comprises a further step h) applying a coating, in particular base coating, on an exterior surface of the aluminium tube. Advantageously, the coating, in particular base coating, serves as a primary coating facilitating application of subsequent layers or coatings. The coating, in particular base coating, may be a coloured coating. Further, the coating, in particular base coating, may be applied by means of paint rollers.

Further, the method preferably comprises a further step i) drying the coating, in particular base coating, applied on the exterior surface of the aluminium tube. The drying step may be carried out at a temperature from 100° C. to 130° C. and/or during a period of 5 minutes to 8 minutes.

Further, the method preferably comprises a further step j) printing, in particular dry offset printing, the coating, in particular base coating, applied and dried on the exterior surface of the aluminium tube. Typically, the printing step finalizes a decoration process of the aluminium tube. For example, a design may be printed onto the coating, in particular base coating, applied and dried on the exterior surface of the aluminium tube. For example, the printing step may be carried out by means of an offset printing process which is then cured together with a first applied external coating, particularly in a furnace or another furnace, in particular at a temperature from 160° C. to 190° C. and/or during a period of 5 minutes to 8 minutes.

Further, the method preferably comprises a further step k) capping the aluminium tube, i.e. closing the aluminium tube by means of a cap. The capping step can be carried out by means of screwing a cap onto a neck of the aluminium tube, wherein the cap has an internal or female thread which is complementary to an external or male thread of the neck.

Further, the method preferably comprises a further step l) applying a latex coating or heat-sealable varnish on an interior surface of the aluminium tube which is close to a rear end of the aluminium tube, i.e. an end which is arranged opposite to an aluminium tube's end having a shoulder and a neck. Advantageously, application of the latex coating or heat-sealable varnish allows sealing of the rear end after folding and/or crimping the aluminium tube.

Further, the method preferably comprises a further step m) packaging the aluminium tube.

In a further embodiment of the invention, the method further comprises the following steps, expediently in chronological order:
  c) cutting the aluminium tube, expediently at a rear end of the aluminium tube, wherein the rear end is arranged opposite to an aluminium tube's end having a shoulder and a neck,
  d) forming a thread, in particular an external thread, preferably an external circular thread or external oval thread, on or around the neck of the aluminium tube,
  e) annealing the aluminium tube,
  f) applying a coating, in particular lacquer, on an interior surface of the aluminium tube,
  g) curing of the coating, in particular lacquer, applied on the interior surface of the aluminium tube,
  h) applying a coating, in particular base coating, on an exterior surface of the aluminium tube,
  i) drying the coating, in particular base coating, applied on the exterior surface of the aluminium tube, j) printing the coating, in particular base coating, applied and dried on the exterior surface of the aluminium tube,
k) capping the aluminium tube,
l) applying a latex coating or a heat-sealable varnish on an interior surface of the aluminium tube which is close to the rear end of the aluminium tube, i.e. the end of the aluminium tube which is arranged opposite to the aluminium tube's end having the shoulder and neck, and
m) optionally packaging the aluminium tube.

With respect to further details and advantages of the steps c)-m), reference is made in its entirety to the previous description.

According to a second aspect, the present invention refers to a method for manufacturing or producing an aluminium slug. The method comprises the following steps, expediently in chronological order:

a) providing at least one fraction of post-consumer recycled aluminium scrap or providing at least one fraction of post-consumer recycled aluminium scrap and at least one fraction of post-industrial recycled aluminium scrap and/or at least one fraction of primary aluminium alloy, b) melting the at least one fraction of post-consumer recycled aluminium scrap to a molten mass or melting the at least one fraction of post-consumer recycled aluminium scrap and the at least one fraction of post-industrial recycled aluminium scrap and/or the at least one fraction of primary aluminium alloy to a molten mass, c) controlling the composition of the molten mass and optionally adding alloying elements to the molten mass, d) casting, in particular continuous casting, of the molten mass to a strip or casting, in particular continuous casting, of a remolten mass to form a strip, e) hot rolling of the strip, f) cold rolling of the hot rolled strip and g) forming a slug from the cold rolled strip, wherein the steps/step a) and/or b) and/or c) are/is carried out such that the molten mass comprises or consists of an aluminium alloy consisting of
>98.4% by weight of Al,
0.10% by weight to 0.30% by weight of Si,
0.25% by weight to 0.45% by weight of Fe,
0.01% by weight to 0.08% by weight of Cu,
0.15% by weight to 0.40% by weight of Mn,
at most 0.15% by weight of Mg,
at most 0.05% by weight of Zn,
at most 0.05% by weight of Cr,
at most 0.05% by weight of Ni,
at most 0.05% by weight of Ti and
at most 0.05% by weight of other alloying elements and/or other impurities,
with the proviso that the aforementioned ingredients of the aluminium alloy add to 100% by weight, and wherein the steps/step a) and/or b) and/or c) are/is carried out such that the molten mass has proportion of the post-consumer recycled aluminium scrap >60% by weight, in particular >75% by weight, preferably >90% by weight, based on the total weight of the molten mass.

Preferably, the steps/step a) and/or b) are/is carried out such that the molten mass comprises or consists of an aluminium alloy consisting of
>98.7% by weight of Al,
0.15% by weight to 0.25% by weight of Si,
0.30% by weight to 0.40% by weight of Fe,
0.02% by weight to 0.06% by weight of Cu,
0.20% by weight to 0.30% by weight of Mn,
at most 0.05% by weight, in particular <0.04% by weight, preferably <0.03% by weight, more preferably <0.02% by weight, especially preferably <0.01% by weight, of Mg,
at most 0.05% by weight of Zn,
at most 0.05% by weight of Cr,
at most 0.05% by weight of Ni,
at most 0.05% by weight of Ti and
at most 0.05% by weight of other alloying elements and/or other impurities,
with the proviso that the aforementioned ingredients of the aluminium alloy add to 100% by weight.

In particular the steps/step a) and/or b) are/is carried out such that the molten mass has proportion of the post-consumer recycled aluminium scrap from 65% by weight to 100% by weight, in particular 80% by weight to 100% by weight, preferably 95% by weight to 100% by weight, more preferably 97% by weight to 100% by weight, especially preferably 99% by weight to 100% by weight, based on the total weight of the molten mass.

More preferably, the steps/step a) and/or b) are/is carried out such that the molten mass is made or produced exclusively from post-consumer recycled aluminium scrap.

Preferably, the remolten mass of step d) is obtained by casting, in particular continuous casting, of the molten mass formed by means of step b) to form ingots and subsequently by remelting the ingots to form the remolten mass.

Further, the method may comprise between step b) and step d) a further step bd) cleaning of the molten mass, in particular by means of injection of argon or by means of alternative techniques.

By means of the step c), it is possible to selectively add alloying elements so as to obtain a molten mass having the desired composition, if need be. Further, the molten mass may be purged, in particular by means of argon. Thus, additional cleaning may be advantageously accomplished.

Further, the method may comprise between step c) and step d) a further step cd) casting of the molten mass to ingots and melting the ingots to form a remolten mass.

Further, the step d) may be carried out using a casting speed, in particular continuous casting speed, of 4 m/min to 10 m/min.

Preferably, the step d) is carried out by means of a rotary casting device. The rotary casting device preferably comprises a casting wheel and a steel band. The molten mass or remolten mass may be transferred at a temperature from 680° C. to 750° C. to the casting wheel. Preferably, the molten mass or remolten mass is casted, in particular continuously casted, on the casting wheel and solidified between the casting wheel and the steel band. A cooling necessary for solidification of the molten mass or remolten mass is preferably achieved by spraying water via nozzles on the casting wheel and the steel band.

Further, step e) is preferably carried out at a temperature from 460° C. to 500° C.

Further, the method may comprise between step e) and step f) a further step ef) cooling the strip to a temperature of 10° C. to 90° C., preferably 30° C. to 70° C.

Further, the step f) is preferably carried out at a temperature from 10° C. to 90° C., preferably 30° C. to 70° C.

Further, the step g) is preferably carried out by punching out a slug of the cold rolled strip.

Further, the method may comprise a further step h) annealing of the slug. Preferably, the step h) is carried out at a temperature from 480° C. to 580° C., preferably 500° C. to 550° C., and/or during a period from 30 minutes to 3 hours. Thus, a homogeneous microstructure and in particular uniform distribution of the optional alloying elements may be accomplished.

Further, the method may comprise a further step i) cooling the annealed slug, in particular by forced air cooling. Preferably, the step i) is carried out with a cooling rate of 0.01 K/s to 0.1 K/s.

Further, the method may comprise a further step j) roughening of the cooled slug, in particular by placing the slug in a drum which is rotated or vibrated and thereby deburrs and roughens the slug's surface. Alternatively, the slug may be blasted with an abrasive.

With respect to further features and advantages of the method, in particular with respect to the slug, post-consumer recycled aluminium scrap, post-industrial recycled aluminium scrap and the primary aluminium alloy, reference is made in its entirety to the embodiments described under the first aspect of the invention. The features and advantages described in the context of the first aspect of the invention, in particular with respect to the slug, the post-consumer recycled aluminium scrap, the post-industrial recycled aluminium scrap and the primary aluminium alloy, do apply accordingly with respect to the method according to the second aspect of the invention.

A third aspect of the invention relates to an aluminium tube, in particular flexible aluminium tube, preferably collapsible or squeezable aluminium tube.

The aluminium tube is produced or producible by means of a method according to the first aspect of the invention and/or the aluminium tube comprises or consists of an aluminium alloy consisting of
>98.4% by weight of Al,
0.10% by weight to 0.30% by weight of Si,
0.25% by weight to 0.45% by weight of Fe,
0.01% by weight to 0.08% by weight of Cu,
0.15% by weight to 0.40% by weight of Mn,
at most 0.15% by weight of Mg,
at most 0.05% by weight of Zn,
at most 0.05% by weight of Cr,
at most 0.05% by weight of Ni,
at most 0.05% by weight of Ti and
at most 0.05% by weight of other alloying elements and/or other impurities,
with the proviso that the aforementioned ingredients of the aluminium alloy add to 100% by weight.

In a further embodiment of the invention, the aluminium alloy consists of
>98.7% by weight of Al,
0.15% by weight to 0.25% by weight of Si,
0.30% by weight to 0.40% by weight of Fe,
0.02% by weight to 0.06% by weight of Cu,
0.20% by weight to 0.30% by weight of Mn,
at most 0.05% by weight, in particular <0.04% by weight, preferably <0.03% by weight, more preferably <0.02% by weight, especially preferably <0.01% by weight, of Mg,
at most 0.05% by weight of Zn,
at most 0.05% by weight of Cr,
at most 0.05% by weight of Ni,
at most 0.05% by weight of Ti and
at most 0.05% by weight of other alloying elements and/or other impurities,
with the proviso that the aforementioned ingredients of the aluminium alloy add to 100% by weight.

In a further embodiment of the invention, the aluminium tube is composed or made of >60% by weight, in particular >75% by weight, preferably >90% by weight, of post-consumer recycled aluminium scrap, based on the total weight of the aluminium tube. In other words, in a further embodiment of the invention, the aluminium tube has a proportion of post-consumer recycled aluminium scrap of >60% by weight, in particular >75% by weight, preferably >90% by weight, based on the total weight of the aluminium tube.

In particular, the aluminium tube may be composed or made of 65% by weight to 100% by weight, in particular 80% by weight to 100% by weight, preferably 95% by weight to 100% by weight, more preferably 97% by weight to 100% by weight, especially preferably 99% by weight to 100% by weight, of post-consumer recycled aluminium scrap, based on the total weight of the aluminium tube. In other words, the aluminium tube may in particular have a proportion of post-consumer recycled aluminium scrap from 65% by weight to 100% by weight, in particular 80% by weight to 100% by weight, preferably 95% by weight to 100% by weight, more preferably 97% by weight to 100% by weight, especially preferably 99% by weight to 100% by weight, based on the total weight of the aluminium tube.

Further, the aluminium tube may be composed or made of post-consumer recycled aluminium scrap and post-industrial recycled aluminium scrap.

Further, the aluminium tube may be composed or made of post-consumer recycled aluminium scrap and primary aluminium alloy.

Further, the aluminium tube may be composed or made of post-consumer recycled aluminium scrap, post-industrial recycled aluminium scrap and primary aluminium alloy.

Further, the aluminium tube may be composed or made of post-industrial recycled aluminium scrap from 0% by weight to 35% by weight, in particular 0% by weight to 20% by weight, preferably 0% by weight to 5% by weight, more preferably 0% by weight to 3% by weight, especially preferably 0% by weight to 1% by weight, based on the total weight of the aluminium tube.

Further, the aluminium tube may be composed or made of primary aluminium alloy from 0% by weight to 35% by weight, in particular 0% by weight to 20% by weight, preferably 0% by weight to 5% by weight, more preferably 0% by weight to 3% by weight, especially preferably 0% by weight to 1% by weight, based on the total weight of the aluminium tube.

Further, the aluminium tube may be free of post-industrial recycled aluminium scrap and/or primary aluminium alloy.

Preferably, the aluminium tube is composed or made (exclusively) of post-consumer recycled aluminium scrap.

In a further embodiment of the invention, the aluminium tube has a shoulder thickness from 0.2 mm to 0.7 mm, in particular 0.2 mm to 0.5 mm, preferably 0.15 mm to 0.4 mm. Thus, the squeezability and emptiability of the aluminium tube may be additionally improved.

Further, the aluminium tube may have a neck thickness, in particular without considering an external thread of the neck, from 1.5 mm to 3 mm, in particular 1.5 mm to 2.65 mm, preferably 1.75 mm to 2.65 mm.

Further, the aluminium tube, in particular except from the shoulder and/or neck, may have a wall thickness from 0.06 mm to 0.16 mm, in particular 0.08 mm to 0.15 mm, preferably 0.08 mm to 0.12 mm. Thus, the squeezability and emptiability of the aluminium tube may be additionally improved.

Further, the aluminium tube may have a length from 45 mm to 230 mm, in particular 90 mm to 220 mm.

Further, the aluminium tube may have a diameter from 11 mm to 50 mm, in particular 22 mm to 40 mm.

The term "diameter" as used according to the present invention refers to a greatest possible mutual distance of two points along a circumferential line of the aluminium tube or the slug/aluminium slug.

In a further embodiment of the invention, the aluminium tube has a shoulder thickness <0.7 mm and a diameter from >40 mm to 50 mm.

In a further embodiment of the invention, the aluminium tube has a shoulder thickness <0.6 mm and a diameter from >32 mm to 40 mm.

In a further embodiment of the invention, the aluminium tube has a shoulder thickness <0.5 mm and a diameter from >25 mm to 32 mm.

In a further embodiment of the invention, the aluminium tube has a shoulder thickness <0.4 mm and a diameter from 11 mm to 25 mm.

With respect to further features and advantages of the aluminium tube, in particular with respect to the post-consumer recycled aluminium scrap, post-industrial recycled aluminium scrap and the primary aluminium alloy, reference is made in its entirety to the previous description, in particular to the embodiments described under the first aspect of the invention. The features and advantages described in the context of the previous description, in particular the first aspect of the invention, in particular with respect to the aluminium tube, the post-consumer recycled aluminium scrap, the post-industrial recycled aluminium scrap and the primary aluminium alloy, do apply accordingly with respect to the aluminium tube according to the third aspect of the invention.

A fourth aspect of the invention relates to an aluminium slug.

The aluminium slug comprises or consists of an aluminium alloy consisting of
>98.4% by weight of Al,
0.10% by weight to 0.30% by weight of Si,
0.25% by weight to 0.45% by weight of Fe,
0.01% by weight to 0.08% by weight of Cu,
0.15% by weight to 0.40% by weight of Mn,
at most 0.15% by weight of Mg,
at most 0.05% by weight of Zn,
at most 0.05% by weight of Cr,
at most 0.05% by weight of Ni,
at most 0.05% by weight of Ti and
at most 0.05% by weight of other alloying elements and/or other impurities,
with the proviso that aforementioned ingredients of the aluminium alloy add to 100% by weight, wherein the aluminium slug is made of >60% by weight, in particular >75% by weight, preferably >90% by weight, of post-consumer recycled aluminium scrap, based on the total weight of the aluminium slug.

In a further embodiment, the aluminium alloy consists of
>98.7% by weight of Al,
0.15% by weight to 0.25% by weight of Si,
0.30% by weight to 0.40% by weight of Fe,
0.02% by weight to 0.06% by weight of Cu,
0.20% by weight to 0.30% by weight of Mn,
at most 0.05% by weight, in particular <0.04% by weight, preferably <0.03% by weight, more preferably <0.02% by weight, especially preferably <0.01% by weight, of Mg,
at most 0.05% by weight of Zn,
at most 0.05% by weight of Cr,
at most 0.05% by weight of Ni,
at most 0.05% by weight of Ti and
at most 0.05% by weight of other alloying elements and/or other impurities, with the proviso that the aforementioned ingredients of the aluminium alloy add to 100% by weight.

Preferably, the aluminium slug is composed or made of >60% by weight, in particular >75% by weight, preferably >90% by weight, of post-consumer recycled aluminium scrap, based on the total weight of the aluminium slug. In other words, preferably, the aluminium slug has a proportion of post-consumer recycled aluminium scrap of >60% by weight, in particular >75% by weight, preferably >90% by weight, based on the total weight of the aluminium slug.

In particular, the aluminium slug may be composed or made of post-consumer recycled aluminium scrap from 65% by weight to 100% by weight, in particular 80% by weight to 100% by weight, preferably 95% by weight to 100% by weight, more preferably 97% by weight to 100% by weight, especially preferably 99% by weight to 100% by weight, based on the total weight of the aluminium slug. In other words, the aluminium slug may in particular have a proportion of post-consumer recycled aluminium scrap from 65% by weight to 100% by weight, in particular 80% by weight to 100% by weight, preferably 95% by weight to 100% by weight, more preferably 97% by weight to 100% by weight, especially preferably 99% by weight to 100% by weight, based on the total weight of the aluminium slug.

Further, the aluminium slug may be composed or made of post-consumer recycled aluminium scrap and post-industrial recycled aluminium scrap.

Further, the aluminium slug may be composed or made of post-consumer recycled aluminium scrap and primary aluminium alloy.

Further, the aluminium slug may be composed or made of post-consumer recycled aluminium scrap, post-industrial recycled aluminium scrap and primary aluminium alloy.

Further, the aluminium slug may be composed or made of post-industrial recycled aluminium scrap from 0% by weight to 35% by weight, in particular 0% by weight to 20% by weight, preferably 0% by weight to 5% by weight, more preferably 0% by weight to 3% by weight, especially preferably 0% by weight to 1% by weight, based on the total weight of the aluminium slug.

Further, the aluminium slug may be composed or made of primary aluminium alloy from 0% by weight to 35% by weight, in particular 0% by weight to 20% by weight, preferably 0% by weight to 5% by weight, more preferably 0% by weight to 3% by weight, especially preferably 0% by weight to 1% by weight, based on the total weight of the aluminium slug.

Further, the aluminium slug may be free of post-industrial recycled aluminium scrap and/or primary aluminium alloy.

Preferably, the aluminium slug is composed or made (exclusively) of post-consumer recycled aluminium scrap.

Further, the aluminium slug preferably has a diameter from 10.5 mm to 50 mm, in particular 21 mm to 40 mm.

Further, the aluminium slug preferably has a height of 3 mm to 8 mm, in particular 3.2 mm to 6 mm.

With respect to further features and advantages of the aluminium slug, in particular with respect to the aluminium scrap, reference is made in its entirety to the previous description, in particular to the embodiments described under the first aspect of the invention. The features and advantages described in the context of the previous description, in particular the second aspect of the invention, in particular with respect to the aluminium slug, the post-consumer recycled aluminium scrap, the post-industrial recycled aluminium scrap and the primary aluminium alloy, do apply accordingly with respect to the aluminium slug according to the fourth aspect of the invention.

A fifth aspect of the invention relates to the use of an aluminium alloy consisting of
>98.4% by weight of Al,
0.10% by weight to 0.30% by weight of Si,
0.25% by weight to 0.45% by weight of Fe,
0.01% by weight to 0.08% by weight of Cu,
0.15% by weight to 0.40% by weight of Mn,
at most 0.15% by weight of Mg,
at most 0.05% by weight of Zn,
at most 0.05% by weight of Cr,
at most 0.05% by weight of Ni,
at most 0.05% by weight of Ti and
at most 0.05% by weight of other alloying elements and/or other impurities,
with the proviso that the aforementioned ingredients of the aluminium alloy add to 100% by weight,
for the manufacture or production of a collapsible or squeezable aluminium tube.
Preferably, the aluminium alloy consists of
>98.7% by weight of Al,
0.15% by weight to 0.25% by weight of Si,
0.30% by weight to 0.40% by weight of Fe,
0.02% by weight to 0.06% by weight of Cu,
0.20% by weight to 0.30% by weight of Mn,
at most 0.05% by weight, in particular <0.04% by weight, preferably <0.03% by weight, more preferably <0.02% by weight, especially preferably <0.01% by weight, of Mg,
at most 0.05% by weight of Zn,
at most 0.05% by weight of Cr,
at most 0.05% by weight of Ni,
at most 0.05% by weight of Ti and
at most 0.05% by weight of other alloying elements and/or other impurities,
with the proviso that the aforementioned ingredients of the aluminium alloy add to 100% by weight.

With respect to further features and advantages of the aluminium alloy and the collapsible or squeezable aluminium tube, reference is made in its entirety to the previous description. In that regard, the features and advantages described in the context of the previous description do apply accordingly with respect to the use according to the fifth aspect of the invention.

Further features and advantages of the invention will become clear from the following description of preferred embodiments in form of figures including respective figure descriptions and an example in conjunction with the subject-matter of the dependent claims. The individual features can be realized either singularly or severally in combination in one embodiment of the invention. The preferred embodiments merely serve for illustration and better understanding of the invention and are not to be understood as in any way limiting the invention.

BRIEF FIGURE DESCRIPTIONS

The figures schematically show:
FIG. 1a a side view of an embodiment of a collapsible or squeezable aluminium tube according to the present invention,
FIG. 1b a top view of the collapsible or squeezable aluminium tube shown in FIG. 1a,
FIG. 2a a side view of a further embodiment of a collapsible or squeezable aluminium tube according to the present invention and
FIG. 2b a top view of the collapsible or squeezable aluminium tube shown in FIG. 2a.

DETAILED FIGURE DESCRIPTION

FIG. 1a schematically shows an embodiment of a collapsible or squeezable aluminium tube 1 according to the present invention.

The aluminium tube 1 comprises a tube body 2, a shoulder 3 and a neck 4. The tube body 2 is preferably in the form of a hollow cylinder having a circular cross-section.

The shoulder 3 is, in particular immediately, arranged between the tube body 2 and the neck 4. Preferably, the shoulder 3 has a conical form (i.e. is cone-shaped).

Further, the neck 4 preferably comprises an external or male thread 5. The external or male thread 5 is adapted to engage with a complementary internal or female thread of a cap.

The neck 4 leads to an opening 6 of the aluminium tube 1. The opening 6 can be sealed, in particular by an integrally formed membrane (not shown) to be pierced by a user before the first discharge of a content of the tube 1 by manual pressure. The membrane guarantees the integrity of the tube content. The opening 6 is adapted, in particular after piercing the integrally formed membrane, to facilitate discharge upon hand pressure on the tube body 2 and/or shoulder 3.

Further, the aluminium tube 1 may have an open or unclosed end 7. FIG. 1b schematically shows a top view of the aluminium tube 1 as shown in FIG. 1a.

FIG. 2a schematically shows a side view of a further embodiment of a collapsible or squeezable aluminium tube 1 according to the present invention.

The aluminium tube 1 comprises a tube body 2, a shoulder 3 and a neck 4. The tube body 2 has preferably a conical or tapered form, in particular entirely along its longitudinal direction.

The shoulder 3 is, in particular immediately, arranged between the tube body 2 and the neck 4. Preferably, the shoulder 3 has a conical form (i.e. is cone-shaped).

Further, the neck 4 preferably comprises an external or male thread 5. The external or male thread 5 is adapted to engage with a complementary internal or female thread of a cap.

The neck 4 leads to an opening 6 of the aluminium tube 1. The opening 6 can be sealed, in particular by an integrally formed membrane (not shown) to be pierced by a user before the first discharge of a content of the tube 1 by manual pressure. The membrane guarantees the integrity of the tube content. The opening 6 is adapted, in particular after piercing the integrally formed membrane, to facilitate discharge upon hand pressure on the tube body 2 and/or shoulder 3.

Figure 2B:
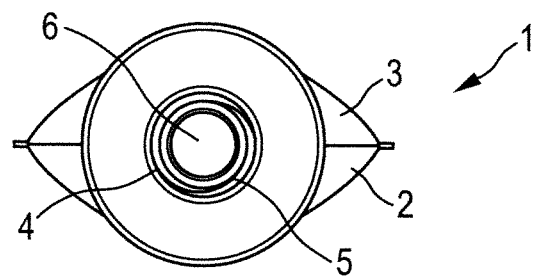

Further, the aluminium tube 1 has a rear end 7 comprising a fold 8. Expediently, the fold 8 extends along the cross or transverse direction of the aluminium tube 1 and rear end 7, respectively. The fold 8 may be, for example, in the form of a double, triple or saddle fold. FIG. 2b schematically shows a top view of the aluminium tube 1 as shown in FIG. 2a.

EXAMPLE SECTION

95% by weight of post-consumer recycled aluminium scrap from used aerosol aluminium cans and used aluminium tubes was supplied as ingots together with 5% by weight of post-industrial recycled aluminium scrap from the production of collapsible tubes made out of EN-AW 1070A alloy. The blended scrap material was molten and the melt composition was adjusted to the following composition (in % by weight):
Al: 99.15
Si: 0.18
Fe: 0.37
Cu: 0.03
Mn: 0.24
Mg: <0.01
Cr: <0.01
Zn: 0.01
Ti: 0.01

The melt was then casted to an aluminium strip from which slugs were stamped out. Subsequently, the slugs were annealed at a temperature of around 500° C. to 520° C. for around 2 hours to 3 hours, followed by a cooling step at a cooling rate of lower than 0.05 K/s. The slugs prepared in such a way had a diameter of 24.7 mm and a thickness of 3.6 mm each.

From these slugs, tubes were formed by means impact extrusion (press type Herlan CP55) with a final length of 125 mm and a diameter of 25 mm, with two different shoulder thickness values (0.64 mm as reference and 0.22 mm as reduced thickness).

After the annealing process at about 380° C., an internal coating comprising a solvent-based epoxy-phenolic lacquer was applied by spraying which was then cured in a continuous polymerization oven at about 260° C. Subsequently, an external coating based on a solvent-based modified polyester lacquer was applied and then dried in a drying furnace at about 110° C. After a further printing step, the external coating was cured together with a printing layer in another furnace at about 175° C.

The following physical properties/dimensions of the tubes were compared:
diameter measured according to DIN EN 13046
length measured according to DIN EN 13046
shoulder thickness measured according to DIN EN 13046
thickness membrane measured according to DIN 5059-1
porosity measured according to DIN EN 15384-1, DIN EN 15384-2 and
annealing grade measured according to DIN EN 16285.

The obtained results are shown in the below table 1:

TABLE 1 summary of the obtained results

|  | Specification | Comparative example | Example | Standard |
|---|---|---|---|---|
| Diameter | 24.8-25.1 mm | 24.9 mm | 24.89 mm | DIN EN 13046 |
| Length | 124.5-125.5 | 125.06 mm | 124.92 mm | DIN EN 13046 |
| shoulder thickness | 0.5-0.8 mm | 0.64 mm | 0.22 mm | DIN EN 13046 |
| thickness membrane | 0.06-0.14 mm | 0.12 mm | 0.11 mm | DIN 5059-1 |

TABLE 1-continued summary of the obtained results

|  | Specification | Comparative example | Example | Standard |
|---|---|---|---|---|
| porosity | <=25 mA | 11.66 mA | 7.27 mA | DIN EN 15384-2 |
| Deformation of tube body | 8-13 mm | 10.38 mm | 9.33 mm | DIN EN 16285 |

It can be seen that the tubes with the lower shoulder thickness also showed a lower deformation of the tube body in the "guillotine test" (according to DIN EN 16285) which is equivalent to a lower hardness compared to the comparative example (9.33 mm compared to 10.38 mm).

The invention claimed is:

1. A squeezable or collapsible aluminium tube having a shoulder and a neck, wherein the aluminium tube is produced or producible by impact extrusion of a slug and comprises an aluminium alloy consisting of:
>98.4% by weight of Al,
0.10% by weight to 0.30% by weight of Si,
0.25% by weight to 0.45% by weight of Fe,
0.01% by weight to 0.08% by weight of Cu,
0.15% by weight to 0.40% by weight of Mn,
at most 0.15% by weight of Mg,
at most 0.05% by weight of Zn,
at most 0.05% by weight of Cr,
at most 0.05% by weight of Ni,
at most 0.05% by weight of Ti and
at most 0.05% by weight of other impurities,
wherein the aforementioned ingredients of the aluminium alloy add to 100% by weight,
the squeezable or collapsible tube having a folded or crimped end which creates a seal.

2. The squeezable or collapsible aluminium tube according to claim 1, wherein the aluminium alloy consists of:
>98.7% by weight of Al,
0.15% by weight to 0.25% by weight of Si,
0.30% by weight to 0.40% by weight of Fe,
0.02% by weight to 0.06% by weight of Cu,
0.20% by weight to 0.30% by weight of Mn,
at most 0.05% by weight of Mg,
at most 0.05% by weight of Zn,
at most 0.05% by weight of Cr,
at most 0.05% by weight of Ni,
at most 0.05% by weight of Ti and
at most 0.05% by weight of other impurities,
wherein the aforementioned ingredients of the aluminium alloy add to 100% by weight.

3. The squeezable or collapsible aluminium tube according to claim 1, wherein the aluminium tube has a shoulder thickness from 0.2 mm to 0.7 mm.

4. The squeezable or collapsible aluminium tube according to claim 1, wherein the aluminium tube has:
a shoulder thickness <0.7 mm and a diameter from >40 mm to 50 mm
or
a shoulder thickness <0.6 mm and a diameter from >32 mm to 40 mm
or
a shoulder thickness <0.5 mm and a diameter from >25 mm to 32 mm
or
a shoulder thickness <0.4 mm and a diameter from 11 mm to 25 mm.

5. The squeezable or collapsible aluminium tube according to claim 1, wherein the squeezable or collapsible aluminium tube consists of:
>98.4% by weight of Al,
0.10% by weight to 0.30% by weight of Si,
0.25% by weight to 0.45% by weight of Fe,
0.01% by weight to 0.08% by weight of Cu,
0.15% by weight to 0.40% by weight of Mn,
at most 0.15% by weight of Mg,
at most 0.05% by weight of Zn,
at most 0.05% by weight of Cr,
at most 0.05% by weight of Ni,
at most 0.05% by weight of Ti and
at most 0.05% by weight of other impurities,
wherein the aforementioned ingredients of the aluminium alloy add to 100% by weight.

6. The squeezable or collapsible aluminium tube according to claim 1, wherein the aluminium tube has a shoulder thickness from 0.2 mm to 0.5 mm.

7. The squeezable or collapsible aluminium tube according to claim 1, wherein the aluminium tube has a shoulder thickness from 0.15 mm to 0.4 mm.

8. The squeezable or collapsible aluminium tube according to claim 1, wherein the aluminium tube includes a tube body and is configured to dispense contents with hand pressure applied to the tube body.

9. The squeezable or collapsible aluminium tube according to claim 1, wherein the aluminium tube which is not configured to include a spray valve.

10. The squeezable or collapsible aluminium tube according to claim 1, wherein the aluminium tube has a deformation of 1 mm to 43 mm when subjected to the DIN EN 16285 test.

* * * * *